(12) United States Patent
Pregont

(10) Patent No.: US 7,305,239 B2
(45) Date of Patent: Dec. 4, 2007

(54) METHOD AND APPARATUS FOR RELAYING CALLS

(75) Inventor: Gary J. Pregont, Dundee, IL (US)

(73) Assignee: Motorola, Inc., Schaumburg, IL (US)

( * ) Notice: Subject to any disclaimer, the term of this patent is extended or adjusted under 35 U.S.C. 154(b) by 32 days.

(21) Appl. No.: 11/199,498

(22) Filed: Aug. 8, 2005

(65) Prior Publication Data

US 2007/0032230 A1 Feb. 8, 2007

(51) Int. Cl.
*H04Q 7/20* (2006.01)
(52) U.S. Cl. .................. 455/445; 455/11.1; 455/41.2; 455/407; 455/417; 455/464
(58) Field of Classification Search ............. 455/445, 455/11.1, 41.2, 407, 417, 464
See application file for complete search history.

(56) References Cited

U.S. PATENT DOCUMENTS

| | | | |
|---|---|---|---|
| 6,405,027 B1 * | 6/2002 | Bell | 455/403 |
| 6,785,510 B2 * | 8/2004 | Larsen | 455/11.1 |
| 2005/0026650 A1 * | 2/2005 | Russell | 455/554.1 |
| 2005/0176368 A1 * | 8/2005 | Young et al. | 455/11.1 |
| 2006/0052066 A1 * | 3/2006 | Cleveland et al. | 455/101 |
| 2006/0057961 A1 * | 3/2006 | Dietz et al. | 455/41.2 |
| 2006/0223439 A1 * | 10/2006 | Pinel et al. | 455/11.1 |

* cited by examiner

*Primary Examiner*—Nghi H. Ly

(57) ABSTRACT

When a first communication unit (204) receives a request from a second communication unit (102) (over an ad hoc network) to relay a call, the first communication unit will start a data call (e.g., voice over IP call) over the cellular link using the cellular phone's data capability. Since, for billing and authentication purposes, this call should be billed to the second communication unit, the cellular phone call is not set up using the standard call setup procedure (i.e. Destination phone number from the second communication unit and Originating phone number from the first communication unit). Instead, the call is setup as a "free" phone call from a first communication unit to a predefined, free number. The relay passes through the cellular link as data in the form of a data call (e.g., VoIP call). The cellular infrastructure would then route the call to its final destination.

17 Claims, 4 Drawing Sheets

300

METHOD AND APPARATUS FOR RELAYING CALLS

FIELD OF THE INVENTION

The present invention relates generally to relaying calls and in particular to relaying ad-hoc calls over a cellular link.

BACKGROUND OF THE INVENTION

As described in the international application published under the Patent Cooperation Treaty, publication number WO 00/54539, ROUTING IN A MULTI-STATION NETWORK, increased coverage reliability and increased throughput are some of the benefits of using ad-hoc networking. In cellular communication systems utilizing ad-hoc networking, cellular handsets are equipped to operate in both the cellular and ad-hoc networks. Users access the cellular infrastructure through the ad-hoc network whenever they cannot access the network equipment directly, or when they find it more advantageous to do so. Using an ad-hoc air interface, such users transmit to another user, which forwards (relays) the transmission to the infrastructure through the cellular air interface. Such a system is shown in FIG. 1.

As shown, communication unit 102 existing within area 101 is unable to communicate directly with infrastructure equipment 106. By utilizing ad-hoc networking, communication unit 102 communicates with communication unit 104 (via ad-hoc air interface 103). Communication unit 104 then relays the communication to infrastructure 106 via air interface 105.

To be able to relay a call, communication unit 104 must be equipped to hold a simultaneous call over the ad hoc link (802.11, Bluetooth, etc) and the cellular link (GSM, CDMA2000, etc). The call will involve more than one RF link and multiple air interfaces. The Motorola E680 phone is an example of such a piece of subscriber equipment. Once communication unit 104 is relaying the call, it is incapable of making a phone call of his own since communication units typically only have one transmitter. Additionally, when communication unit 104 is relaying a call, the cellular system will recognize the call as originating from communication unit 104, when in reality, the call was originated by communication unit 102. Therefore, a need exists for a method and apparatus for relaying calls which allows the relaying device to complete multiple simultaneous calls, and additionally correctly identifies the originator of the call.

DETAILED DESCRIPTION OF THE DRAWINGS

Figure 1:
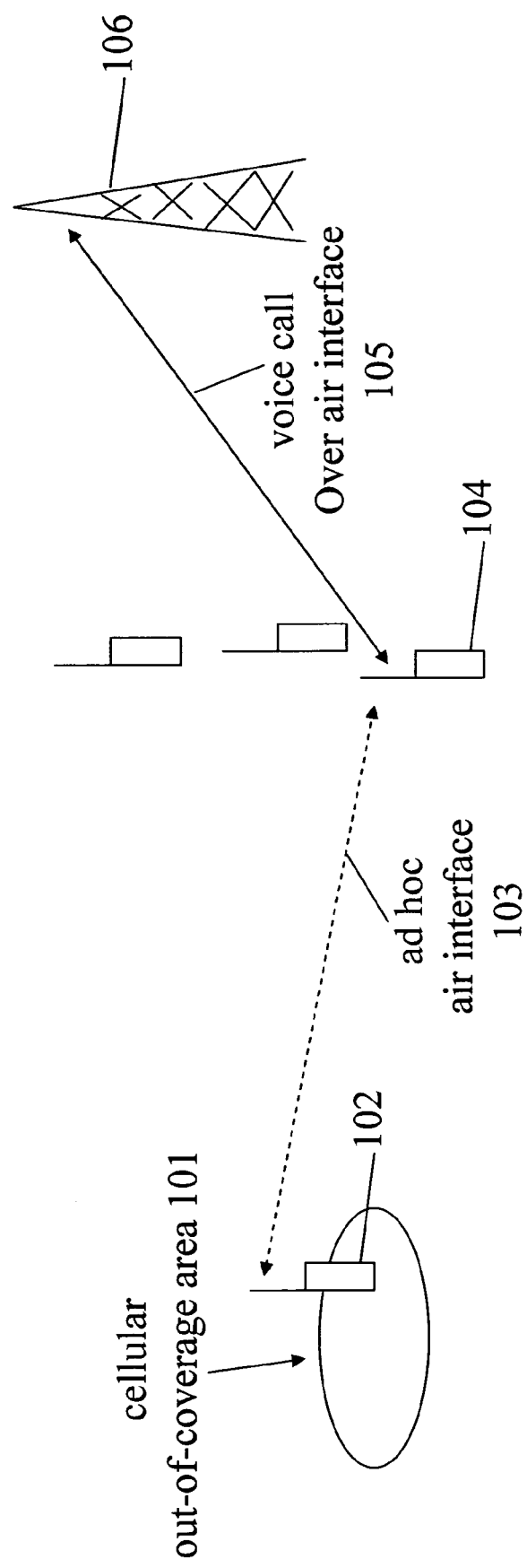
FIG. 1 is a block diagram of an ad-hoc communication system.

To address the above-mentioned need, a method and apparatus for relaying calls are provided herein. More particularly, when a first communication unit receives a request from a second communication unit (over an ad hoc network) to relay a call, the first communication unit will start a data call (e.g., voice over IP call) over the cellular link using the cellular phone's data capability. Since, for billing and authentication purposes, this call should be billed to the second communication unit, the cellular phone call is not set up using the standard call setup procedure (i.e. Destination phone number from the second communication unit and Originating phone number from the first communication unit). Instead, the call is setup as a "free" phone call from a first communication unit to a predefined, free number. In a first embodiment, the free number can be accessed by multiple phones simultaneously. The "free" phone call contains the actual destination phone number from the second communication unit as well as the second communication unit's identity for billing purposes. The relay passes through the cellular link as data in the form of a data call (e.g., VoIP call). The cellular infrastructure would then route the call to its final destination.

If, during a relayed call, the first communication unit decided to make a phone call of its own, they would dial the number as usual. The phone, knowing that it is currently relaying another call, would not set up the call as a normal cellular call; instead, it would use the existing data call to piggyback a message to the infrastructure equipment telling it to set up another VoIP call to the new number. Then, the two VoIP sessions would co-exist on the single data session between the cellular phone and the infrastructure equipment.

The present invention encompasses a method for a first communication unit to relay a first call from a second communication unit. The method comprises the steps of receiving communications from the second communication unit that the first call needs to be relayed, establishing a data session to relay the first call, and determining that a second call needs to be made by the first communication unit. The second call is made simultaneously with the first call via the established data session.

The present invention additionally encompasses a method comprising the steps of establishing a first call via a first wireless communication system protocol, receiving communications via a second communication system protocol that a second call needs to be relayed, and re-establishing the first call via a data session established using a first wireless communication system protocol. The second call is relayed simultaneously with the first call via the established data session.

The present invention additionally encompasses a first communication unit comprising a first receiver receiving communications from a second communication unit that a first call needs to be relayed, logic circuitry establishing a data session to relay the first call, and a first transmitter relaying the first call along with a second call placed by the first communication unit to a infrastructure equipment via the data session.

The present invention additionally encompasses an apparatus comprising logic circuitry establishing a first call via a first wireless communication system protocol, a receiver receiving communications via a second wireless communication system protocol that a second call needs to be relayed, and a transmitter relaying the second call simultaneously with the first call via a data session using the first wireless communication system protocol.

Figure 2:
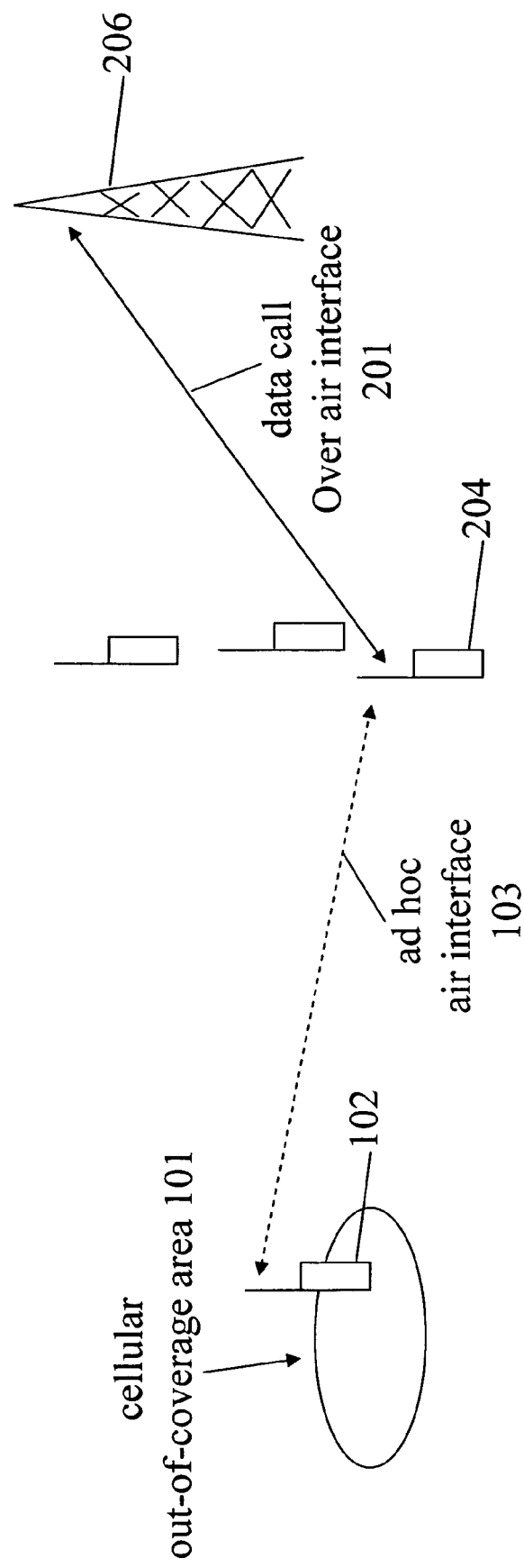
FIG. 2 is a block diagram of an ad-hoc communication system.

Turning now to the drawings, wherein like numerals designate like components, FIG. 2 is a block diagram of an ad-hoc network and cellular network. As shown, communication unit 204 now relays calls via a data call placed over air interface 201. More particularly, the data call initiated by communication unit 204 differs from a standard voice call in that it has the ability to use a greater bandwidth and higher data rates than is typically allocated to a standard voice call. The greater bandwidth is advantageous when the need arises to combine multiple calls over the same data call.

While infrastructure equipment 206 may use any cellular over-the-air protocol, in the preferred embodiment of the present invention network equipment 206 utilizes a Code Division, Multiple Access protocol such as the next generation CDMA system protocol as described in the cdma2000 International Telecommunication Union-Radiocommunication (ITU-R) Radio Transmission Technology (RTT) Candidate Submission document. Additionally, the ad-hoc network may use any short range communication system protocol, such as, but not limited to a Bluetooth system protocol, an 802.11 system protocol, . . . , etc.

Infrastructure equipment 101 includes a number of network elements (not shown) such as base stations, Centralized Base Station Controllers (CBSCs), Mobile Switching Centers (MSCs) and the like. In the preferred embodiment of the present invention, all network elements are available from Motorola, Inc. (Motorola Inc. is located at 1301 East Algonquin Road, Schaumburg, ILL 60196). It is contemplated that network elements within network equipment 206 are configured in well known manners with processors, memories, instruction sets, and the like, which function in any suitable manner to perform the function set forth herein.

Figure 3:
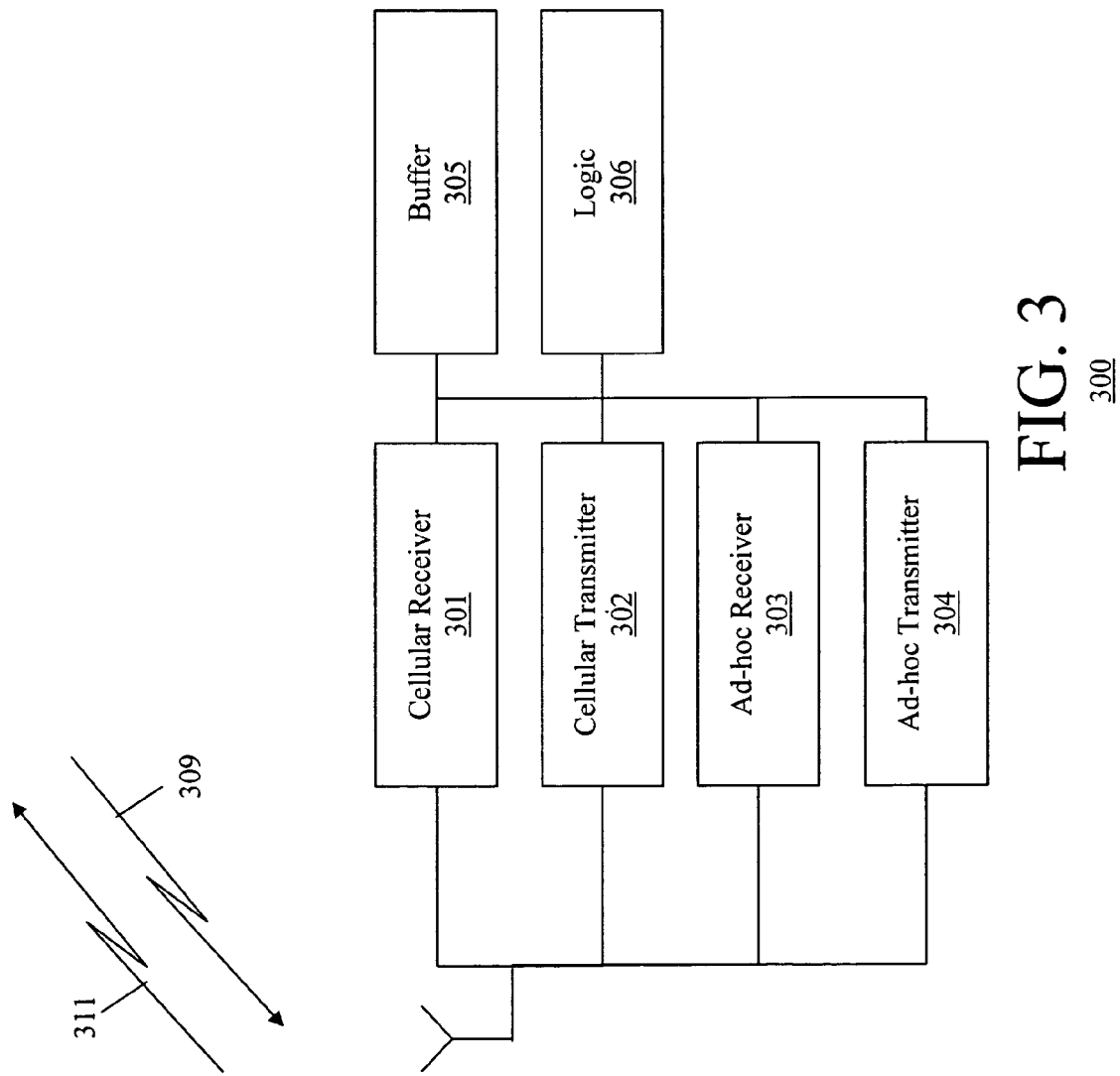
FIG. 3 is a block diagram of a communication unit.

FIG. 3 is a block diagram of communication unit 300 designed to act as a relay. As shown, communication unit 300 comprises cellular and ad-hoc receivers 301 and 303, respectively, cellular and ad-hoc transmitters 302 and 304, respectively, buffer 305, and logic circuitry 306. As discussed above, transmitter 301 and receiver 302 are designed to operate over a cellular air interface (e.g., GSM, CDMA, WCDMA, . . . , etc.) and an ad-hoc transmitter 303 and receiver 304 operate using an ad-hoc air interface (e.g., BLUETOOTH, 802.11, . . . , etc.). As one of ordinary skill in the art will recognize, the cellular air interface (utilizing a cellular over-the-air protocol) typically serves long-range communication, while the ad-hoc air interface (utilizing an ad-hoc over-the-air protocol) serves short- range communication.

While communication unit 300 is acting as a relay, it is continuously receiving transmissions 309 (via receiver 304) from another communication unit utilizing the ad-hoc air interface and relays (prior to, or after, buffering via buffer 305) these transmissions to infrastructure equipment via transmitter 302 and uplink communication signal 311 utilizing a data channel on the cellular air interface. Similarly, during relay operations, communication unit 300 is receiving transmissions (via receiver 301) from infrastructure equipment 206 over the cellular network's data channel, and relaying them to a second communication unit via transmitter 304 and the ad-hoc network. When communication unit 300 is relaying communication through another remote, or communication unit, communication unit 300 is generally receiving downlink communications and transmitting uplink communications to another communication unit via the ad-hoc air interface.

Figure 4:
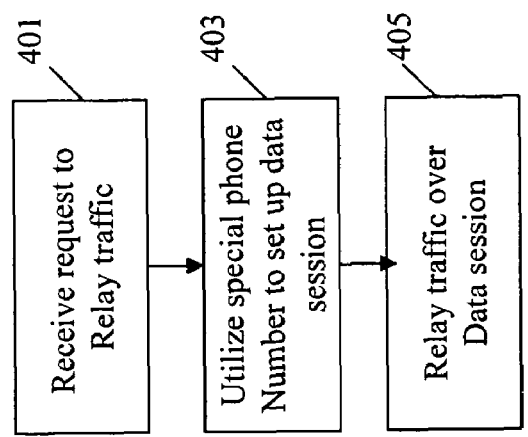
FIG. 4 is a flow chart showing operation of the communication unit of FIG. 3.

FIG. 4 is a flow chart showing operation of communication unit 300 when acting as a relay node. In particular, FIG. 4 describes setting up a relay using a data session. The logic flow begins at step 401 where a first communication unit, and in particular receiver 303, receives a request from a second communication unit to relay a call from the second communication unit. As discussed above, the request to relay traffic is received over a short-range ad-hoc link using a first communication system protocol (e.g., a BLUETOOTH link, or an IEEE 802.11 link). At step 403 a special phone number is utilized to set up a data session. Since, for billing and authentication purposes, the relayed call should be billed to the second communication unit, the data session is not set up using a standard call setup procedure (i.e. Destination phone number from User 2 and Originating phone number from User 1). Instead, a "free" phone call is placed from the first communication unit to a predefined number. This predefined number could act similar to today's dial up modem. That is, one number can be accessed by multiple phones simultaneously. This "free" phone call results in a data session being established. During the call, information such as the actual destination phone number from the second communication unit as well as the second communication unit's identity for billing purposes is provided to infrastructure equipment 206. Additionally, the data session takes place using a second communication system protocol such as a cellular communication system protocol.

Once the data session has been established, the first call is relayed to infrastructure equipment 206 using the data session (step 405). The relaying takes place as a Voice-over-IP (VOIP) call over the cellular link using the cellular phone's data capability. During the relay, receiver 303 receives communication from the second communication unit. The received communication unit is passed to logic unit 306 where it is buffered in buffer 305. Transmitter 302 is utilized by logic circuitry 306 to relay the buffered communications to infrastructure equipment 206. The conversation passes through the cellular link as data in the form of a VoIP call. The "service" at the infrastructure equipment would then route the call to its final destination.

Figure 5:
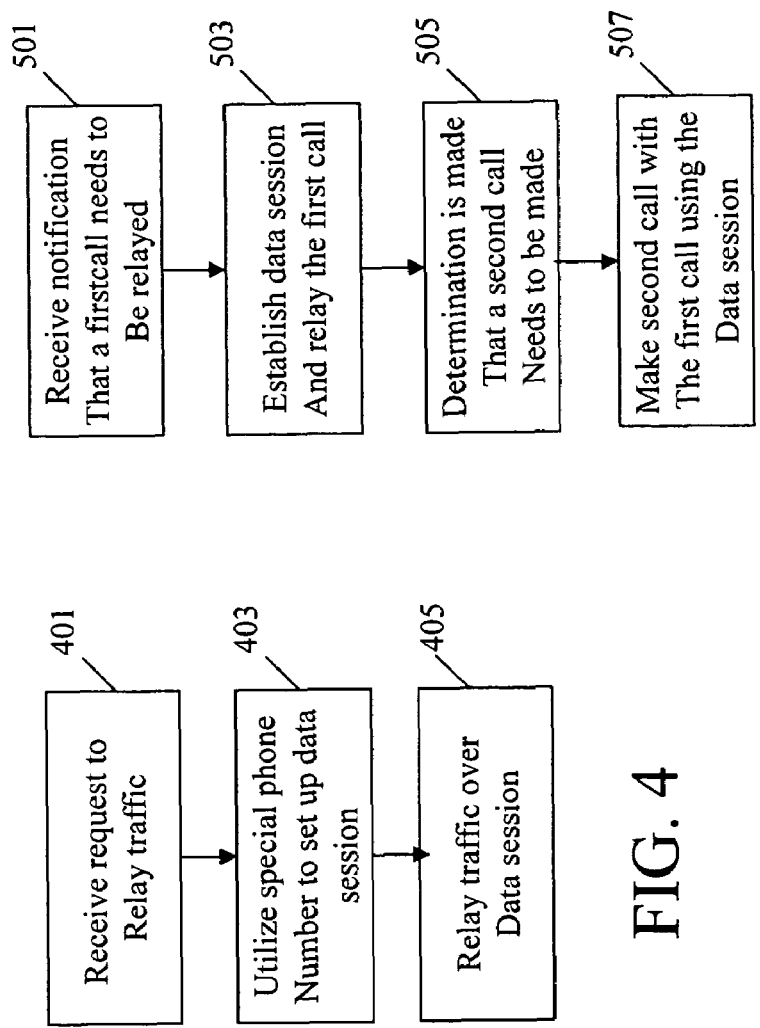
FIG. 5 is a flow chart showing operation of the communication unit of FIG. 3.

FIG. 5 is a flow chart showing operation of communication unit 300. In particular, FIG. 5 shows those steps performed by communication unit 300 (first communication unit) when, during an active relay session, communication unit 300 wishes to place a call. The logic flow begins at step 501 where a first communication unit, and in particular, receiver 303 receives notification from a second communication unit that a first call needs to be relayed. As discussed above, this notification is made using a first communication system protocol such as an ad-hoc communication system protocol. At step 503 a data session is established by logic circuitry 306 to relay the first call and the first call is relayed using a second communication system protocol (e.g., cellular system protocol). As discussed the data session is established using a phone number that will be un-billed to the first communication unit. At step 505 logic circuitry 306 determines that a second call needs to be made by the first communication unit. Finally, at step 507 the second call is made simultaneously with the first call via the established data session. In particular transmitter 302 is utilized to transmit the first call along with the second call to infrastructure equipment via the data session.

Figure 6:
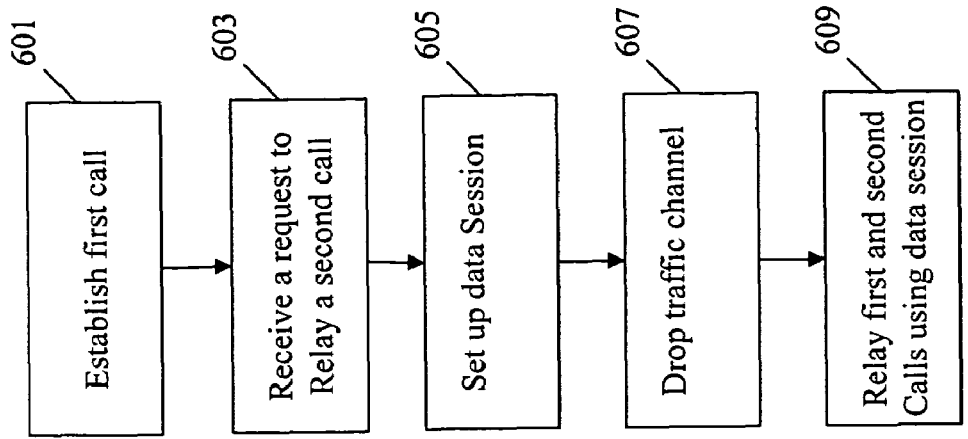
FIG. 6 is a flow chart showing operation of the communication unit of FIG. 3.

FIG. 6 is a flow chart showing operation of communication unit 300. In particular, FIG. 6 shows those steps performed by communication unit 300 when, during an active first call, communication unit 300 receives a request to relay a second call from a second communication unit. The logic flow begins at step 601 where a first call is established by logic circuitry 306 using a first wireless communication system protocol and transmitted over a traffic channel. Particularly, the first call is established using a standard cellular communication system protocol used to transmit voice communications between the communication unit and infrastructure equipment.

At step 603, receiver 303 receives a request over an ad-hoc link, via a second communication system protocol (ad-hoc) to relay a second call. In response logic circuitry 306 sets up a data session (step 605) and drops the traffic channel (step 607). A data session may be set up by sending an additional bandwidth request to the base station along with the existing voice call. Finally, at step 609 the first call is re-established using the data session and both calls are transmitted simultaneously by transmitter 302 using the same data session. More particularly, once the bandwidth is granted, the original call is converted to a VoIP call and both calls may comprise voice calls that are transmitted utilizing the expanded bandwidth. Alternatively, when the bandwidth is granted, the original call may continue via the voice channel and the relayed call will be a data call on the expanded bandwidth While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for a first communication unit to relay a first call from a second communication unit, the method comprising the steps of:
   receiving by the first communication unit, communications from the second communication unit that the first call needs to be relayed;
   the first communication unit establishing a data session for the first communication unit to relay the first call;
   determining that a second call needs to be made by the first communication unit; and
   the first communication unit making the second call to a base station while simultaneously relaying the first call to the base station, wherein both the first call and the second call are placed by the first communication unit utilizing the same established data session.

2. The method of claim 1 wherein the step of establishing the data session to relay the first call, comprises the step of establishing the data session using a phone number that will be un-billed to the first communication unit.

3. The method of claim 1 wherein the step of receiving communications from the second communication unit comprises the step of receiving the communications via a first wireless communication system protocol, and the step of making the first and second calls comprises the step of making the calls via a second wireless communication system protocol.

4. The method of claim 3 wherein the first wireless communication system protocol comprises an ad-hoc communication system protocol and the second wireless communication system protocol comprises a cellular communication system protocol.

5. A method comprising the steps of:
   a communication unit establishing a first call to a base station via a first wireless communication system protocol;
   the communication unit receiving communications via a second communication system protocol that a second call needs to be relayed;
   the communication unit re-establishing the first call to the base station via a data session established using a first wireless communication system protocol; and
   the communication unit relaying the second call to the base station simultaneously with the first call wherein both calls are relayed via the same established data session.

6. The method of claim 5 wherein the first wireless communication system protocol comprises a cellular communication system.

7. The method of claim 6 wherein the second communication system protocol comprises an ad-hoc communication system protocol.

8. The method of claim 5 wherein the step of relaying the second call simultaneously with the first call comprises the step of relaying a second voice call simultaneously with a first voice call.

9. The method of claim 5 wherein the step of re-establishing the first call via the data session comprises the step of re-establishing the first call via a Voice-over-IP data session.

10. A first communication unit comprising:
    a first receiver receiving communications from a second communication unit that a first call needs to be relayed by the first communication unit;
    logic circuitry establishing a data session to relay the first call; and
    a first transmitter relaying the first call, the first transmitter additionally simultaneously placing a second call, wherein both the first call and the second call are placed to a same infrastructure equipment via the same data session.

11. The apparatus of claim 10 wherein the data session is established using a phone number that will be un-billed to the second communication unit.

12. The apparatus of claim 10 wherein the first receiver is a receiver employing a first wireless communication system protocol, and the first transmitter is a transmitter employing a second wireless communication system protocol.

13. An apparatus comprising:
    logic circuitry establishing a first call via a first wireless communication system protocol;
    a receiver receiving communications via a second wireless communication system protocol that a second call needs to be relayed; and
    a single transmitter relaying the second call to infrastructure equipment and simultaneously placing the first call to the infrastructure equipment via a same data session using the first wireless communication system protocol.

14. The apparatus of claim 13 wherein the first wireless communication system protocol comprises a cellular communication system protocol.

15. The apparatus of claim 13 wherein the second wireless communication system protocol comprises an ad-hoc wireless communication system protocol.

16. The apparatus of claim 13 wherein the first and the second calls are voice calls.

17. The apparatus of claim 13 wherein the data session comprises a Voice-over-IP data session.

* * * * *